(12) United States Patent
Pierce et al.

(10) Patent No.: US 10,160,268 B2
(45) Date of Patent: Dec. 25, 2018

(54) CENTRAL TIRE PRESSURE MONITORING SYSTEM

(71) Applicant: HENDRICKSON USA, L.L.C., Itasca, IL (US)

(72) Inventors: Phillippi R. Pierce, Canton, OH (US); Matt J. Wilson, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 151 days.

(21) Appl. No.: 14/337,374

(22) Filed: Jul. 22, 2014

(65) Prior Publication Data

US 2015/0029015 A1    Jan. 29, 2015

Related U.S. Application Data

(60) Provisional application No. 61/858,673, filed on Jul. 26, 2013.

(51) Int. Cl.
*B60C 23/00* (2006.01)

(52) U.S. Cl.
CPC .................................. *B60C 23/003* (2013.01)

(58) Field of Classification Search
CPC ... B60C 23/003; B60C 23/02; B60C 23/0401; B60C 23/00; B60C 23/0408; B60C 23/004; B60C 23/0405; B60C 23/0416; B60C 23/0433; B60C 23/0472; B60C 23/0474; B60C 23/0496; B60C 23/12; B60C 29/00; B60G 2300/0262; B60G 2400/20; B60G 2400/52; B60G 11/27; B60G 11/30; B60G 2300/02; F02D 2041/228; F02D 2200/101; G01M 17/02; Y10T 137/3662; Y10T 137/8326; Y10T 152/10495; Y10T 292/1001
USPC ........................................................ 340/442
See application file for complete search history.

(56) References Cited

U.S. PATENT DOCUMENTS

| | | | |
|---|---|---|---|
| 4,512,278 A | | 4/1985 | Winther |
| 4,658,869 A | * | 4/1987 | Soon-Fu .................. B60S 5/043 137/227 |
| 5,158,122 A | * | 10/1992 | Moffett .................. B60C 29/064 137/227 |

(Continued)

FOREIGN PATENT DOCUMENTS

| | | |
|---|---|---|
| DE | 2929894 A1 | 2/1981 |
| WO | 2013009583 A2 | 1/2013 |

*Primary Examiner* — Fekadeselassie Girma
(74) *Attorney, Agent, or Firm* — Dureska & Moore, LLC; David P. Dureska; Greg Strugalski

(57) ABSTRACT

A central tire pressure monitoring system interfaces with a tire inflation system to check the pressure in all of the tires of a trailer of a heavy-duty vehicle at a single interface location on the trailer, without the need to provide power to the trailer. The tire inflation system includes a source of pressurized air, at least one tire, a pneumatic conduit extending between and fluidly connecting the source of pressurized air to the tire, and a controller fluidly connected to the conduit. The monitoring system includes a monitoring valve fluidly connected to the conduit between the controller and the tire. The monitoring valve includes a port, and a test tool selectively fluidly connects to the monitoring valve port to enable air flow from the tire to the test tool. An indicator fluidly connects to the test tool and provides a reading of a pneumatic pressure in the tire.

12 Claims, 4 Drawing Sheets

(56) References Cited

U.S. PATENT DOCUMENTS

| | | | | |
|---|---|---|---|---|
| 5,709,295 | A * | 1/1998 | Johnson | B60S 5/046 |
| | | | | 194/350 |
| 5,853,020 | A * | 12/1998 | Widner | B60C 23/004 |
| | | | | 137/227 |
| 6,024,139 | A * | 2/2000 | McInnes | B60C 29/062 |
| | | | | 141/38 |
| 6,043,738 | A * | 3/2000 | Stewart | B60C 23/0416 |
| | | | | 340/442 |
| 6,286,565 | B1 * | 9/2001 | Pike | B60C 23/003 |
| | | | | 141/38 |
| 6,711,955 | B1 * | 3/2004 | Wilkerson, Jr. | G01L 17/00 |
| | | | | 340/442 |
| 7,273,082 | B2 * | 9/2007 | White | B60C 23/003 |
| | | | | 152/415 |
| 7,458,270 | B2 * | 12/2008 | Kiefer | B60S 5/043 |
| | | | | 73/146 |
| 8,528,611 | B2 * | 9/2013 | Wilson | B60C 23/003 |
| | | | | 152/416 |
| 8,794,258 | B2 * | 8/2014 | Galasso | F17C 6/00 |
| | | | | 137/223 |
| 2004/0020420 | A1 * | 2/2004 | Evans | B60C 23/02 |
| | | | | 116/34 R |
| 2004/0173296 | A1 * | 9/2004 | White | B60C 23/003 |
| | | | | 152/417 |
| 2005/0194080 | A1 * | 9/2005 | White | B60C 23/003 |
| | | | | 152/417 |
| 2006/0180256 | A1 * | 8/2006 | Mittal | B60C 23/004 |
| | | | | 152/416 |
| 2006/0289103 | A1 * | 12/2006 | Suzuki | B60C 15/024 |
| | | | | 152/544 |
| 2010/0024939 | A1 * | 2/2010 | Kusunoki | B60C 23/003 |
| | | | | 152/416 |
| 2010/0026019 | A1 * | 2/2010 | Couto | B60R 19/48 |
| | | | | 293/118 |
| 2010/0078109 | A1 * | 4/2010 | Wilson | B60C 23/003 |
| | | | | 152/416 |
| 2011/0148617 | A1 * | 6/2011 | Kusunoki | B60C 23/0408 |
| | | | | 340/442 |
| 2012/0024445 | A1 | 2/2012 | Wilson et al. | |
| 2012/0059546 | A1 | 3/2012 | Wilson et al. | |
| 2012/0161955 | A1 | 6/2012 | Togawa | |
| 2012/0168030 | A1 * | 7/2012 | Ohm | F04B 35/06 |
| | | | | 141/94 |
| 2012/0224978 | A1 * | 9/2012 | Ferber | B60C 23/0479 |
| | | | | 417/44.1 |
| 2012/0245859 | A1 * | 9/2012 | Gerardin | G01M 17/022 |
| | | | | 702/34 |
| 2013/0092306 | A1 * | 4/2013 | White | B60C 29/06 |
| | | | | 152/429 |
| 2013/0232085 | A1 * | 9/2013 | Emerson | G06Q 30/0278 |
| | | | | 705/306 |
| 2013/0306192 | A1 * | 11/2013 | Hennig | B60C 23/003 |
| | | | | 141/4 |
| 2013/0343931 | A1 * | 12/2013 | Wilson | B60C 23/003 |
| | | | | 417/410.1 |
| 2014/0110030 | A1 * | 4/2014 | Krempel | B60C 23/12 |
| | | | | 152/450 |
| 2014/0121937 | A1 * | 5/2014 | Drew | F02D 29/02 |
| | | | | 701/101 |
| 2015/0029015 | A1 * | 1/2015 | Pierce | B60C 23/003 |
| | | | | 340/442 |

* cited by examiner

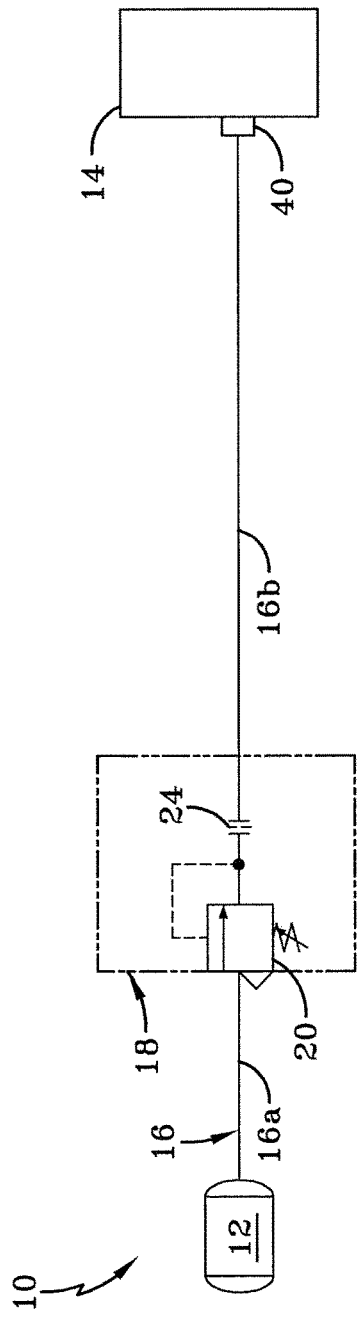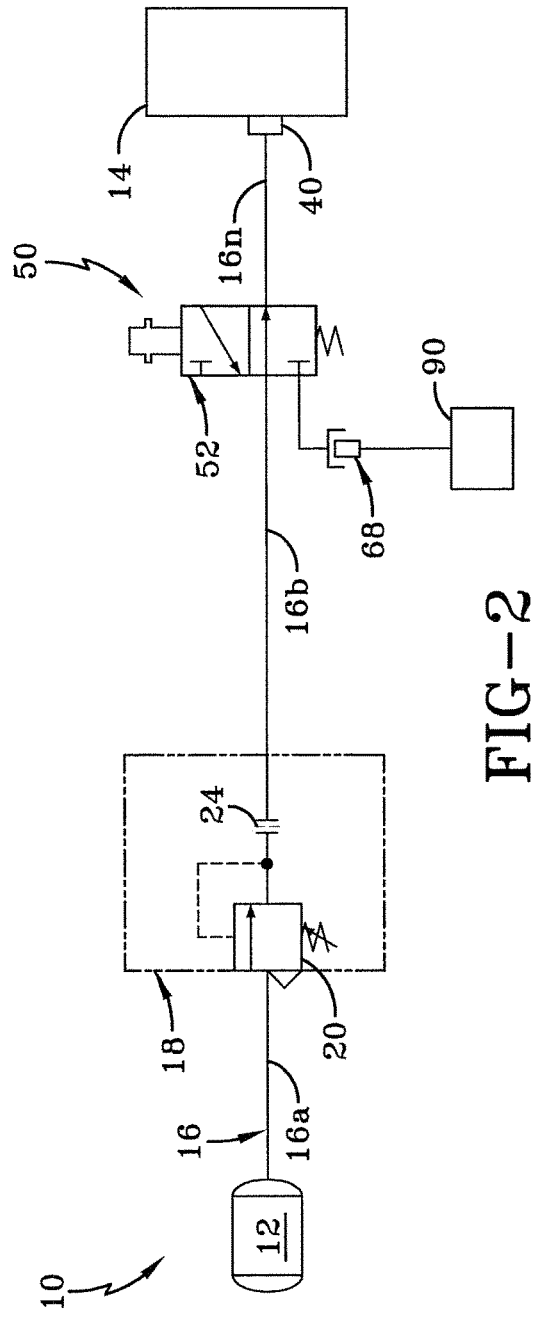

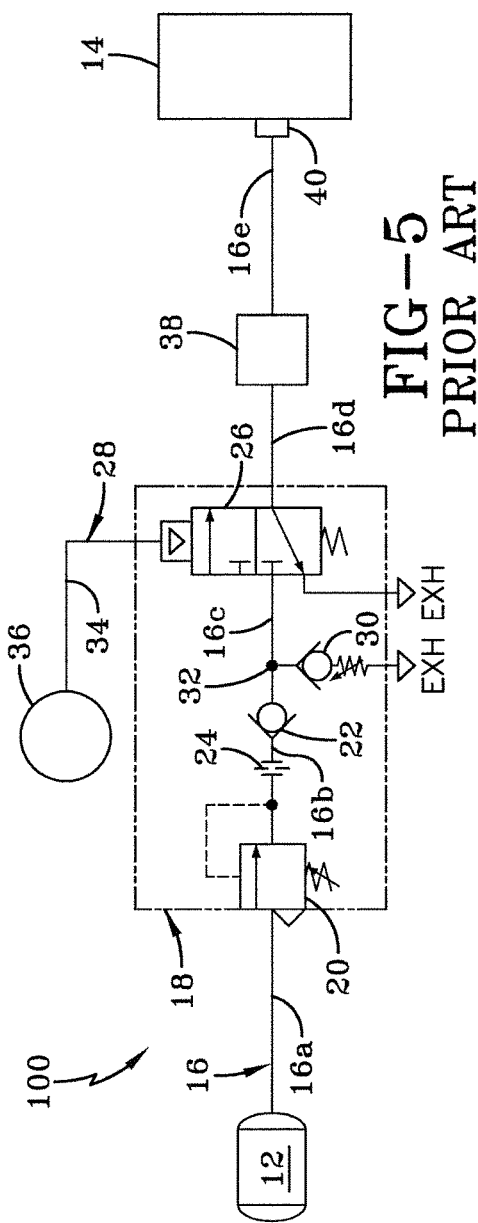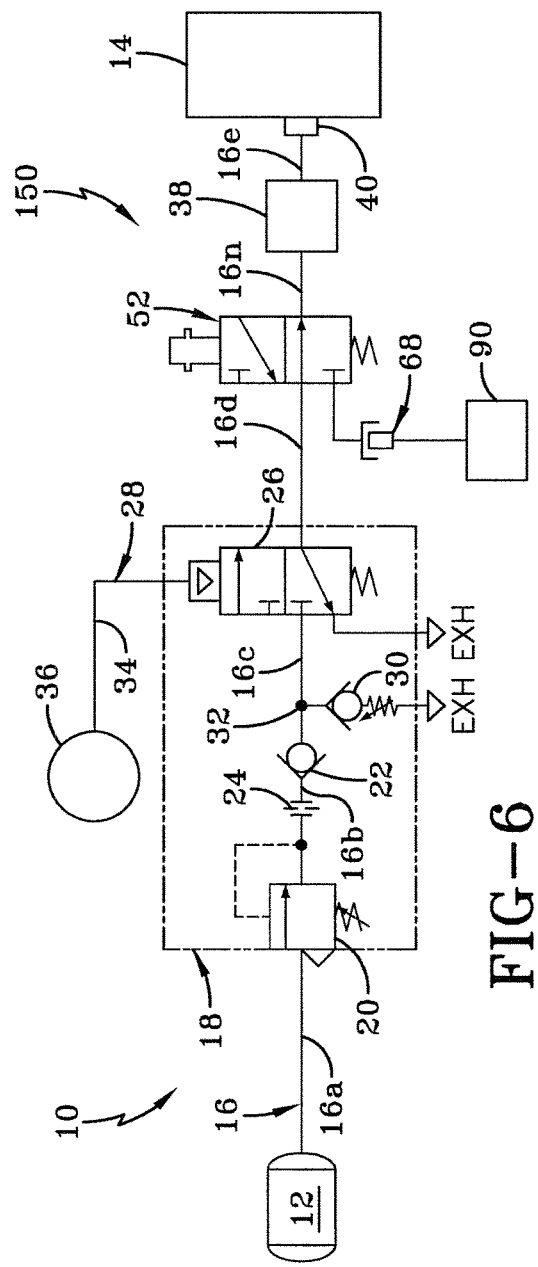

CENTRAL TIRE PRESSURE MONITORING SYSTEM

CROSS-REFERENCE TO RELATED APPLICATIONS

This application claims the benefit of U.S. Provisional Patent Application Ser. No. 61/858,673, which was filed on Jul. 26, 2013.

BACKGROUND OF THE INVENTION

Technical Field

The invention relates to the art of tire pressure monitoring and inflation systems. More particularly, the invention relates to the monitoring of tire air pressure through components of a tire inflation system for heavy-duty vehicles, such as trucks and tractor-trailers or semi-trailers. Still more particularly, the invention is directed to a central tire pressure monitoring system that interfaces with a tire inflation system to check the pressure in all of the tires of a trailer of a heavy-duty vehicle at a single interface location on the trailer, without the need to provide power to the trailer, thereby providing a convenient way to monitor trailer tire pressure when multiple trailers are parked at a site.

Background Art

Heavy-duty vehicles typically include trucks and tractor-trailers or semi-trailers. Tractor-trailers and semi-trailers, which shall collectively be referred to as tractor-trailers for the purpose of convenience, include at least one trailer, and sometimes two or three trailers, all of which are pulled by a single tractor. All heavy-duty vehicles that are trucks or tractor-trailers include multiple tires, each of which is inflated with a fluid or gas, such as air, to an optimum or recommended pressure. This optimum or recommended tire pressure typically is referred to in the art as the target inflation pressure or the target pressure.

However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not significantly below the target pressure and thus under-inflated. Should an air check show that a tire is under-inflated, it is desirable to enable air to flow into the tire to return it to the target pressure. Likewise, it is well known that the air pressure in a tire may increase due to increases in ambient air temperature, so that it is necessary to regularly check the air pressure in each tire to ensure that the tires are not unacceptably above the target pressure and thus over-inflated. Should an air check show that a tire is over-inflated, it is desirable to enable air to flow out of the tire to return it to the target pressure.

The large number of tires on any given heavy-duty vehicle setup makes it difficult to manually check and maintain the target pressure for each and every tire. This difficulty is compounded by the fact that trailers of tractor-trailers or trucks in a fleet may be parked at a site for an extended period of time, during which the tire pressure might not be checked. Any one of these trailers or trucks might be placed into service at a moment's notice, leading to the possibility of operation with under-inflated or over-inflated tires. Such operation may increase the chance of less-than-optimum performance and/or reduced life of a tire in service as compared to operation with tires at the target pressure, or within an optimum range of the target pressure.

Such a need to maintain the target pressure in each tire, and the inconvenience to the vehicle operator having to manually check and maintain a proper tire pressure that is at or near the target pressure, led to the development of prior art tire inflation systems. In these prior art systems, when there is power to the system, an operator selects a target inflation pressure for the vehicle tires. The system then monitors the pressure in each tire and attempts to maintain the air pressure in each tire at or near the target pressure by inflating the tire when the monitored pressure drops below the target pressure. These prior art tire inflation systems inflate the tires by providing air from the air supply of the vehicle to the tires by using a variety of different components, arrangements, and/or methods. Certain prior art systems are also capable of deflation, and these systems deflate the tires when the monitored pressure rises above the target pressure by venting air from the tires to atmosphere.

While being satisfactory for their intended functions, tire inflation systems of the prior art may experience disadvantages in certain situations. For example, as mentioned above, trailers of tractor-trailers from a fleet may be parked at a site for an extended period of time. Because any one of these trailers might be placed into service at a moment's notice, it is prudent for an owner or operator of a fleet to monitor the pressure in the tires of the parked trailers to ensure that tire pressure is maintained at or near a desired level in order to optimize the life of each tire. However, verification of tire pressure through prior art tire inflation systems is performed only when there is electrical power to the system, typically when the vehicle is operating. It is typically undesirable for a fleet owner to have power connected to each parked trailer to check tire pressure, as this is a time-consuming task that consumes manpower, as well as fuel to start up each vehicle, or other power, such as a separate electrical line, which is needed to power up the tire inflation system. All of these factors undesirably increase the cost of maintaining the fleet.

In the prior art, the only manner of checking or verifying the pressure in the tires of a fleet of parked trailers without providing power to each trailer has been for a technician to walk around each trailer and manually check the pressure in each tire with a tire pressure gauge. Because each trailer typically includes eight or more tires, this is an extremely time-consuming task, which again undesirably increases the cost of maintaining the fleet.

As a result, there is a need in the art for a tire pressure monitoring system that overcomes the disadvantages of the prior art by providing a central monitoring system that interfaces with a tire inflation system to check the pressure in all of the tires of a trailer of a heavy-duty vehicle from a single location, without the need to provide power to the trailer. The central tire pressure monitoring system of the present invention satisfies these needs, as will be described in detail below.

BRIEF SUMMARY OF THE INVENTION

An objective of the present invention is to provide a tire pressure monitoring system that interfaces with a tire inflation system to check the pressure in all of the tires of a trailer of a heavy-duty vehicle from a single location.

Another objective of the present invention is to provide a tire pressure monitoring system that checks the pressure in all of the tires of a trailer of a heavy-duty vehicle without the need to provide power to the trailer.

This objective and others are obtained by the central tire pressure monitoring system for a heavy-duty vehicle of the present invention. In an exemplary embodiment of the invention, the vehicle includes a tire inflation system that includes a source of pressurized air, at least one tire, a pneumatic conduit extending between and fluidly connecting the source of pressurized air to the at least one tire, and a controller fluidly connected to the conduit. The monitoring system includes a monitoring valve fluidly connected to the conduit between the controller and the at least one tire. The monitoring valve includes a port, and a test tool is selectively fluidly connected to the monitoring valve port to enable air flow from the at least one tire to the test tool. An indicator is fluidly connected to the test tool, and provides a reading of a pneumatic pressure in the at least one tire.

BRIEF DESCRIPTION OF THE SEVERAL VIEWS OF THE DRAWINGS

The preferred embodiments of the invention, illustrative of the best modes in which Applicants have contemplated applying the principles of the invention, are set forth in the following description and are shown in the drawings, and are particularly and distinctly pointed out and set forth in the appended claims.

FIG. 1 is a schematic diagram of the main components of a first exemplary prior art tire inflation system;

FIG. 2 is a schematic diagram of the components of a the tire inflation system shown in FIG. 1, with a first exemplary embodiment of the central tire pressure monitoring system of the present invention installed on and interfacing with the tire inflation system;

FIG. 5 is a schematic diagram of the main components of a second exemplary prior art tire inflation system; and FIG. 6 is a schematic diagram of the components of a the tire inflation system shown in FIG. 5, with a second exemplary embodiment of the central tire pressure monitoring system of the present invention installed on and interfacing with the tire inflation system.

Similar numerals refer to similar parts throughout the drawings.

DETAILED DESCRIPTION OF THE INVENTION

Figure 3:
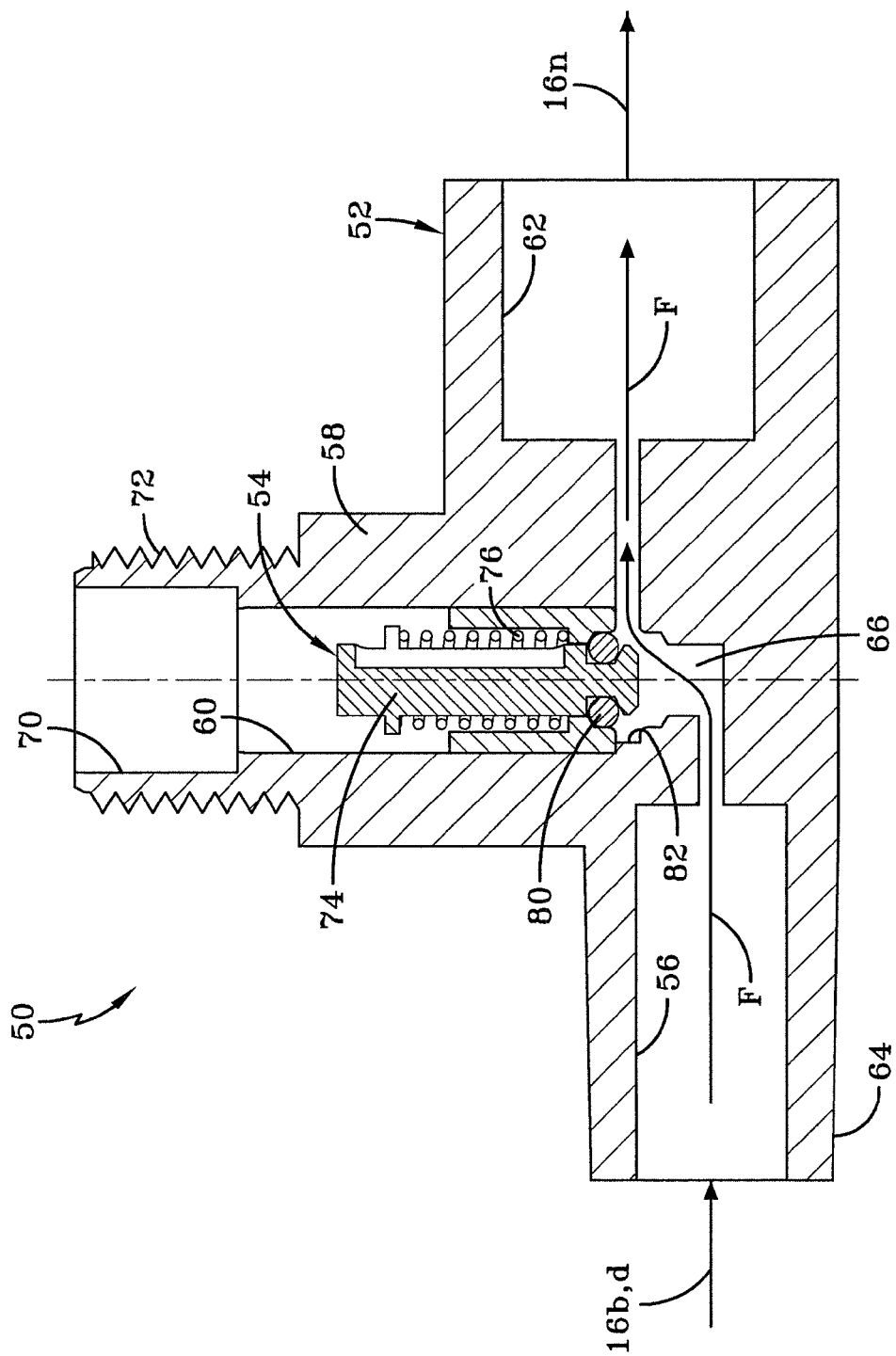
FIG. 3 is an enlarged cross-sectional view of an exemplary monitoring valve of the central tire pressure monitoring system shown in FIG. 2, shown with air flowing through the valve in a non-monitoring state.

In order to better understand the central tire pressure monitoring system of the present invention and the environment in which it operates, a first exemplary prior art tire inflation system, which is schematically shown in FIG. 1, is indicated at 10 and now will be described. It is to be understood that the exemplary prior art tire inflation system 10 is shown only by way of example, as the present invention finds use with any known electronically-regulated, mechanically-regulated or pneumatically-regulated tire inflation system.

Tire inflation system 10 includes a vehicle air supply or source 12 of pressurized or compressed air. Vehicle air supply 12 typically is a main reservoir tank, which is charged with air by a compressor, and will be referred to hereinbelow for the purpose of convenience as a supply tank. Supply tank 12 is connected, by components to be described in detail below, to vehicle tires 14. For the purpose of convenience, only a single tire 14 is illustrated in FIG. 1, but it is to be understood that tire inflation system 10 is utilized with, and branches off to connect to, multiple tires. A pneumatic conduit 16 extends between and interconnects components of inflation system 10. More particularly, a first pneumatic conduit section 16a extends between and fluidly connects supply tank 12 to a controller 18.

It is to be understood that controller 18 may be any tire inflation system controller that is known to those skilled in the art. Controller 18 is represented by a broken line in the Figures, and it is to be further understood that this representation is by way of example, as the individual components associated with controller, and their configuration and arrangement, may be changed or adjusted as known in the art without affecting the concept or operation of the invention. By way of example, controller 18 includes a supply valve 20. A second pneumatic conduit section 16b is fluidly connected to and extends from supply valve 20. Supply valve 20 preferably is a mechanically-operated regulator that is mechanically adjustable to a setting that actuates or opens the valve at or below the target pressure. Preferably, supply valve 20 is biased to a typically closed position, and when the air pressure in second pneumatic conduit section 16b drops below the target pressure, the supply valve opens to enable air to flow through the valve, as known to those skilled in the art. Once supply valve 20 is open, air is delivered from supply tank 12, through first pneumatic conduit section 16a, and to second pneumatic conduit section 16b.

Once the target pressure is reached in second pneumatic conduit section 16b, supply valve 20 closes, as known in the art. The setting at which supply valve 20 opens and closes to achieve the target pressure is adjustable by mechanical means, such as by rotation of a knob, set screw, stem, and the like by a technician or vehicle operator, depending on system requirements. Also based upon system requirements, the means for adjusting supply valve 20 may be placed in a convenient location inside the vehicle cab (not shown), or outside of the vehicle cab, such as on the trailer of a tractor-trailer. Supply valve 20 preferably also includes a flow switch 24, which can detect an air flow leak, as known in the art. It is to be understood that supply valve 20 may be any mechanically-operated valve known to those skilled in the art which is suitable for controlling air flow in pneumatic conduit 16.

When supply valve 20 is in an open position, pressurized air flows through the valve, through second pneumatic conduit section 16b, and to a tire valve 40, which is fluidly connected to the second pneumatic conduit section. Tire valve 40, which preferably is a Schrader valve, is pneumatically connected to tire 14 as known in the art. Tire valve 40 typically is spring-biased to a closed position, and typically is open only when mechanical means are employed to hold it open. Preferably, second pneumatic conduit section 16b includes a fitting (not shown) that holds tire valve 40 open by mechanical means while the second pneumatic conduit section is connected to the tire valve to enable inflation of tire 14. In this manner, when tire inflation system 10 is in an inflation mode, air flows via pneumatic conduit 16 from supply tank 12, through supply valve 20, tire valve 40, and into tire 14.

It is important to note that a single tire 14 is shown for the purpose of convenience, as tire inflation system 10 typically includes a plurality of tires, which are often mounted on opposing ends of multiple of axles (not shown) via respective wheels (not shown). To deliver pressurized air to each tire 14, second pneumatic conduit section 16b branches off to separate vehicle axles, with each branch extending through a respective selected axle, and then to each of the tire(s) 14 that are mounted on each axle end. Also, it is to be understood that prior art tire inflation system 10 is shown only by way of example, as the present invention finds use with any known electronically-regulated, mechanically-regulated or pneumatically-regulated tire inflation system.

While being satisfactory for its intended function, prior art tire inflation system 10 of the prior art may experience disadvantages in certain situations. For example, to monitor the pressure in the tires of parked trailers to ensure that tire pressure is maintained at or near a desired level in order to optimize the life of each tire, it is necessary to either provide power to the tire inflation system, which undesirably consumes manpower and/or fuel or other power to power up the tire inflation system as described above, or to have a technician walk around each trailer and manually check the pressure in each tire with a tire pressure gauge. Both of these prior art options undesirably increase the cost of maintaining the fleet. The central tire pressure monitoring system of the present invention overcomes these disadvantages, as will now be described.

The central tire pressure monitoring system of the present invention is directed to a system that interfaces with a tire inflation system to check the pressure in all of the tires of a trailer of a heavy-duty vehicle from a single interface location, without the need to provide power to the trailer. Specific inventive components are employed to achieve the central tire pressure monitoring, as will be described in detail below.

Figure 4:
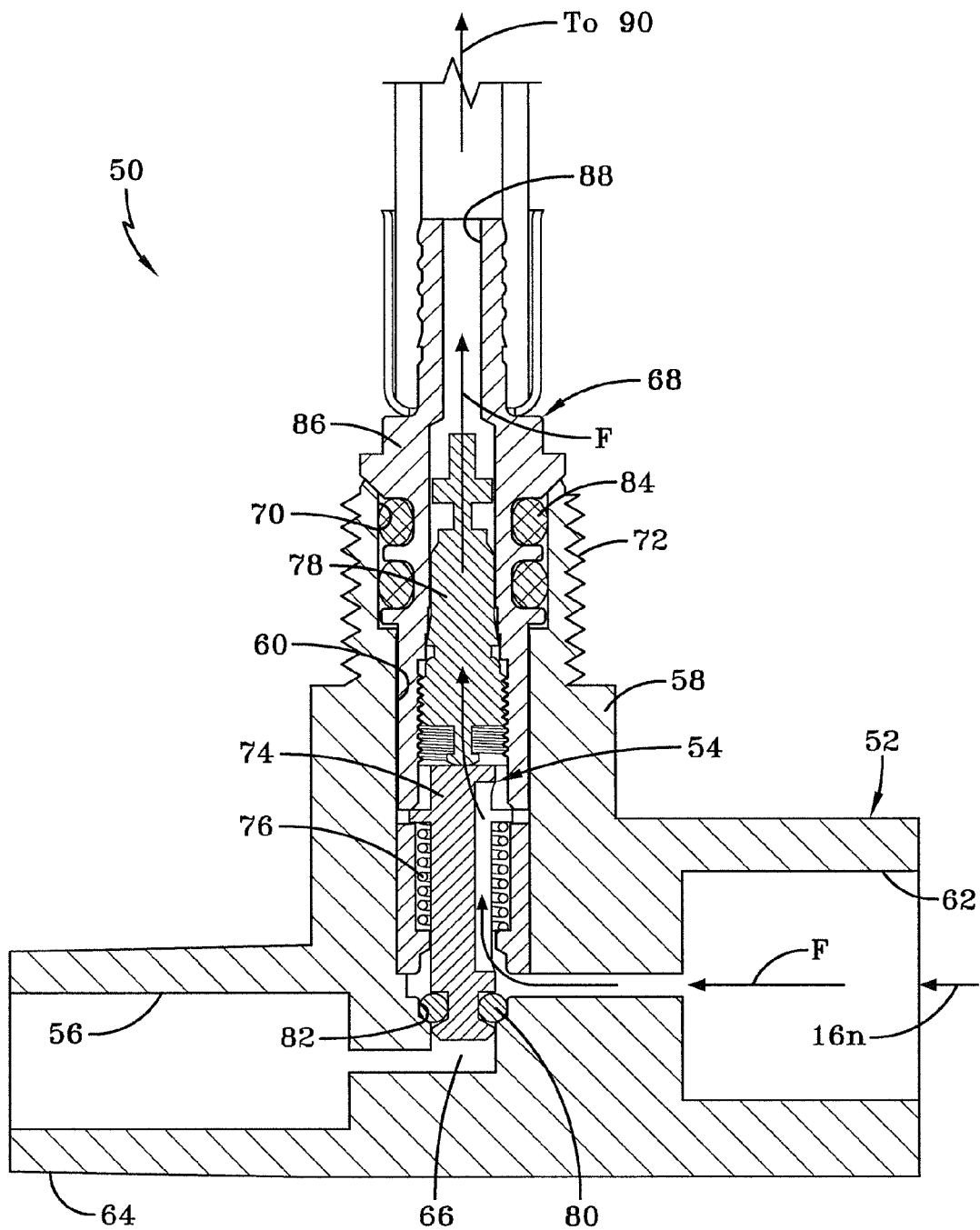
FIG. 4 is a cross-sectional view of the monitoring valve shown in FIG. 3, shown in a monitoring state with a test tool attached to the valve.

Turning now to FIGS. 2-4, a first exemplary embodiment of the central tire pressure monitoring system of the present invention is indicated generally at 50. Central tire pressure monitoring system 50 interfaces with tire inflation system 10, and is shown in FIG. 2 installed on the tire inflation system. Central tire pressure monitoring system 50 includes a pneumatic monitoring system valve 52 that is fluidly connected to pneumatic conduit 16. More particularly, monitoring system valve 52 is fluidly connected to second pneumatic conduit section 16b, which extends from controller 18 to the monitoring system valve.

An additional pneumatic conduit section 16n extends between and is fluidly connected to monitoring system valve 52 and tire valve 40. When monitoring system valve 52 is employed, an additional pneumatic conduit section 16n branches off to separate vehicle axles, with each branch extending through a respective selected axle, and then to each of the tire(s) 14 that are mounted on each axle end. In this manner, monitoring system valve 52 is in fluid communication with all tires 14, and only one monitoring valve is needed for central tire pressure monitoring system 50.

With particular reference to FIG. 3, monitoring system valve 52 preferably is a spring-biased pilot valve, and includes a valve body 64. A valve inlet 56, which is in fluid communication with second pneumatic conduit section 16b, is formed in valve body 64. A valve outlet 62, which is in fluid communication with additional pneumatic conduit section 16n, is also formed in valve body 64. Valve body 64 includes a tee fitting 58, which is formed with a cylindrical cavity 60. A lower portion 66 of cavity 60 is disposed between and is in fluid communication with valve inlet 56 and valve outlet 62, creating a fluid path between the valve inlet and the valve outlet.

A poppet assembly 54 is disposed in cavity 60, and is biased to a position that allows air to flow from second pneumatic conduit section 16b to additional pneumatic conduit section 16n when monitoring is not being conducted. More particularly, poppet assembly 54 includes a plunger 74, which is biased by a spring 76 to maintain the plunger in a retracted position and out of lower portion 66 of cavity 60. Air thus flows along a path, indicated by arrows marked F, from second pneumatic conduit section 16b, through valve inlet 56, through lower portion 66 of cavity 60, past poppet assembly 54, through valve outlet 62, and into additional pneumatic conduit section 16n. In this manner, monitoring system valve 52 is biased to allow air to flow from supply tank 12 to tires 14 through conduit 16 when monitoring is not being conducted.

Turning now to FIG. 4, when monitoring is being conducted, a test tool 68 is fluidly connected to a port 70 formed in tee fitting 58. Port 70 is in fluid communication with tee fitting cavity 60. Test tool 68 includes a coupling 86 that may engage threads 72 formed on tee fitting 58, or which may be a quick-connect coupler or other pneumatic connector or coupler known to those skilled in the art. When connected to tee fitting 58, test tool 68 engages poppet valve assembly 54 to redirect air flow through monitoring system valve 52. More particularly, test tool 68 includes a piston 78 that contacts plunger 74 of poppet valve assembly 54 and overcomes the bias of spring 76 to urge the piston into lower portion 66 of cavity 60. When piston 78 is urged into channel lower portion 66, an O-ring 80 that is mounted on the piston engages sidewalls 82 of the channel lower portion and cooperates with the piston to block the fluid path from valve inlet 56 to valve outlet 62 through the channel lower portion. Air flow, indicated by arrows marked F, then proceeds from additional pneumatic conduit 16n, through cavity 60 about plunger 74, through port 70, and into the test tool.

Coupling 86 of test tool 68 includes O-rings 84 to provide a pneumatic seal with port 70. Coupling 86 is formed with a central bore 88, which enables air to pass from channel 60 and port 70 of tee fitting 58, through the coupling, and into an indicator 90 of the test tool, which will be described in greater detail below. Preferably, test tool 68 includes a source of pressurized air (not shown), such as a portable compressor, a portable tank, or a pneumatic line that is connected to a compressor or tank. The pressurized air source enables air to flow through coupling bore 88, port 70, cavity 60, valve outlet 62 and into additional pneumatic conduit section 16n to charge the conduit section with air in order to open each tire valve 40 (FIG. 2). Such opening of each tire valve 40 enables air to flow from each respective tire 14, through the tire valve, additional pneumatic conduit section 16n, valve outlet 62, cavity 60, and port 70 and into test tool 68 along path F, as indicated in FIG. 4.

Once each tire valve 40 is open and air flows along path F as indicated in FIG. 4, indicator 90 is able to measure and provide a single readout of the pneumatic pressure for tires 14, since all of the tires on the trailer fluidly connect to additional pneumatic conduit section 16n, as described above. More particularly, the pneumatic pressure measured by test tool 68 decays to the lowest pressure in the system, that is, to the lowest tire pressure level. That pressure level is then indicated by indicator 90, allowing a technician to easily determine if the pressure level is below the target pressure, in which case air needs to be added to tire inflation system 10 (FIG. 2) by means known to those skilled in the art.

Indicator 90 may be any one of various forms or types of pressure indicators. For example, indicator 90 may be a simple mechanical gauge that provides a reading after the source of pressurized air provides a pressure greater than the target pressure to open tire valves 40. Once tire valves 40 are open, air flows along path F as indicated in FIG. 4, and the pressure indicated by indicator 90 decays to the pressure in the lowest one of tires 14.

Another type of indicator 90 may be an electronic unit that employs a step-up procedure to check tire pressure. The step-up procedure is more fully described in U.S. Pat. No. 7,273,082, which is owned by the same owner as the present invention, Hendrickson USA, L.L.C. In summary, the source of pressurized air communicates air bursts through monitoring system valve 52 and to additional pneumatic conduit section 16n. Each burst of air is small enough to prevent elevation of the pressure in tires 14 over the target air pressure, and cumulatively are sufficient to cause tire valves 40 to open. Once a predetermined number of bursts of air are communicated, indicator 90 measures and indicates the pressure in additional pneumatic conduit section 16n, which equates to the lowest pressure in tires 14, as tire valves 40 are open. By reading the pressure level on indicator 90, a technician easily determines if the indicated pressure level is below the target pressure, in which case air needs to be added to tire inflation system 10 (FIG. 2). Optionally, if the indicated pressure level is below the target pressure, test tool 68 may be fluidly connected to a source of pressurized air that is sufficient to inflate tires 14 to the target pressure.

It is to be understood that the central tire pressure monitoring system of the present invention may be employed on types of tire inflation systems other than system 10 shown in FIG. 1, including systems that include additional components, capabilities, and/or features. For example, a second exemplary prior art tire inflation system, which is schematically shown in FIG. 5, is indicated at 100 and now will be described.

Similar to first prior art tire inflation system 10, second prior art tire inflation system 100 includes supply tank 12. Supply tank 12 is connected, by components to be described in detail below, to vehicle tires 14. For the purpose of convenience, only a single tire 14 is illustrated in FIG. 5, but it is to be understood that tire inflation system 100 is utilized with, and branches off to connect to, multiple tires. Pneumatic conduit 16 extends between and interconnects components of inflation system 100. More particularly, first pneumatic conduit section 16a extends between and fluidly connects supply tank 12 to controller 18.

By way of example, controller 18 includes supply valve 20. Second pneumatic conduit section 16b is fluidly connected to and extends from supply valve 20. Supply valve 20 preferably is a mechanically-operated regulator that is mechanically adjustable to a setting that actuates or opens the valve at the target pressure. Preferably, supply valve 20 is biased to a typically closed position, and when the air pressure in second pneumatic conduit section 16b drops below the target pressure, the supply valve opens to enable air to flow through the valve, as known to those skilled in the art. Once supply valve 20 is open, air is delivered from supply tank 12, through first pneumatic conduit section 16a, and to second pneumatic conduit section 16b.

Once the target pressure is reached in second pneumatic conduit section 16b, supply valve 20 closes, as known in the art. The setting at which supply valve 20 opens and closes to achieve the target pressure is adjustable by mechanical means, such as by rotation of a knob, set screw, stem, and the like by a technician or vehicle operator, depending on system requirements. Also based upon system requirements, the means for adjusting supply valve 20 may be placed in a convenient location inside the vehicle cab (not shown), or outside of the vehicle cab, such as on the trailer of a tractor-trailer. Supply valve 20 preferably also includes flow switch 24, which can detect an air flow leak, as known in the art. It is to be understood that supply valve 20 may be any mechanically-operated valve known to those skilled in the art which is suitable for controlling air flow in pneumatic conduit 16.

When supply valve 20 is in an open position, pressurized air flows through the valve, through second pneumatic conduit section 16b, and to a first check valve 22, which is fluidly connected to the second pneumatic conduit section. First check valve 22 allows air to flow along pneumatic conduit 16 in a direction extending from supply tank 12 to tires 14, but prevents air from flowing in a direction extending from the tires to the supply tank. In this manner, first check valve 22 ensures that air from tires 14 does not flow to supply tank 12 in the event that the supply tank pressure is lower than the pressure in the tires.

After flowing through first check valve 22, air flows through a third pneumatic conduit section 16c, which extends between and is fluidly connected to the first check valve and an isolation pilot valve 26 of an optional tire isolation system 28, which will be described in greater detail below. A second check valve 30 is fluidly connected to third pneumatic conduit section 16c between first check valve 22 and isolation pilot valve 26 by a tee fitting 32. Second check valve 30 preferably is mechanically adjustable to exhaust air in third pneumatic conduit section 16c to atmosphere if the pressure in the conduit section exceeds a predetermined level. In this manner, second check valve 30 prevents over-pressurization of third pneumatic conduit section 16c.

In regard to optional tire isolation system 28, a parking brake conduit 34 extends between and is fluidly connected to isolation pilot valve 26 and a parking brake 36 of the vehicle. For trailers of tractor-trailer heavy-duty vehicle applications, parking brake 36 is also referred to in the art as an emergency supply of compressed air. The connection of isolation pilot valve 26 to parking brake 36 enables the isolation pilot valve to isolate tires 14 when the vehicle is parked. The construction and operation of isolation pilot valve 26 and tire isolation system 28 is more fully described in U.S. application Ser. No. 13/194,284, which is owned by the same owner as the present invention, Hendrickson USA, L.L.C. In summary, isolation pilot valve 26 obstructs or blocks the flow of air coming from third pneumatic conduit section 16c and exhausts or vents to atmosphere the flow of air coming from a fourth pneumatic conduit section 16d, thereby interrupting fluid communication between supply tank 12 and tires 14. This interruption of fluid communication between supply tank 12 and tires 14 and isolates the tires from the supply tank, which in turn minimizes the pressure loss of the tires through the system when the vehicle is parked. When the vehicle travels over-the-road, air pressure is applied to parking brake 36 to release the parking brake, which opens isolation pilot valve 26 to enable air flow between third pneumatic conduit section 16c and fourth pneumatic conduit section 16d during vehicle operation.

Once pressurized air flows through isolation pilot valve 26 of optional tire isolation system 28, it passes through fourth pneumatic conduit 16d, which extends between and is fluidly connected to the isolation pilot valve and a wheel valve 38. Wheel valve 38 preferably is a diaphragm valve that isolates each tire 14 from the rest of tire inflation system 100. More particularly, wheel valve 38 preferably is spring biased and actuates or opens the wheel valve at a selected pressure setting or pressure level that is below the target pressure, thereby enabling maximum air flow to tires 14 from tire inflation system 100. This selected pressure setting or pressure level is less than the minimum pressure that would be expected to be utilized as a target tire pressure. In this manner, wheel valve 38 remains open during all normal operating conditions of the vehicle and the tire(s) 14, and closes in the event of an extreme condition, such as low or insufficient pressure in fourth pneumatic conduit section 16*d*.

A fifth pneumatic conduit section 16*e* is fluidly connected to and extends between wheel valve 38 and tire valve 40. Tire valve 40, which preferably is a Schrader valve, is pneumatically connected to tire 14 as known in the art. Tire valve 40 typically is spring-biased to a closed position, and typically is open only when mechanical means are employed to hold it open. Preferably, fifth pneumatic conduit section 16*e* includes a fitting (not shown) that holds tire valve 40 open by mechanical means while the fifth pneumatic conduit section is fluidly connected to the tire valve to enable inflation of tire 14. In this manner, when tire inflation system 100 is in an inflation mode, air flows via pneumatic conduit 16 from supply tank 12, through supply valve 20, check valve 22, isolation pilot valve 26 of optional tire isolation system 28, wheel valve 38, tire valve 40, and into tire 14.

It is important to note that a single tire 14 is shown for the purpose of convenience, as tire inflation system 100 typically includes a plurality of tires, which are often mounted on opposing ends of multiple of axles (not shown) via respective wheels (not shown). To deliver pressurized air to each tire 14, fourth pneumatic conduit section 16*d* branches off to separate vehicle axles, with each branch extending through a respective selected axle, and then to each of the tire(s) 14 that are mounted on each axle end. Also, it is to be understood that prior art tire inflation system 100 is shown only by way of example, as the present invention finds use with any known electronically-regulated, mechanically-regulated or pneumatically-regulated tire inflation system.

While being satisfactory for its intended function, second prior art tire inflation system 100 of the prior art may experience disadvantages in certain situations. For example, to monitor the pressure in the tires of parked trailers to ensure that tire pressure is maintained at or near a desired level in order to optimize the life of each tire, it is necessary to either provide power to the tire inflation system, which undesirably consumes manpower and/or fuel or other power to power up the tire inflation system, or to have a technician walk around each trailer and manually check the pressure in each tire with a tire pressure gauge. Both of these prior art options undesirably increase the cost of maintaining the fleet. The second embodiment of the central tire pressure monitoring system of the present invention overcomes these disadvantages, as will now be described.

Turning now to FIG. 6, a second exemplary embodiment of central tire pressure monitoring system of the present invention is indicated generally at 150. Central tire pressure monitoring system 150 interfaces with second prior art tire inflation system 100, and is shown in FIG. 6 installed on the tire inflation system. Central tire pressure monitoring system 150 is similar in structure and function to first embodiment central tire pressure monitoring system 50. For example, second embodiment central tire pressure monitoring system 150 includes pneumatic monitoring system valve 52 that is fluidly connected to pneumatic conduit 16. More particularly, monitoring system valve 52 is fluidly connected to fourth pneumatic conduit section 16*d*, which extends from controller 18 and isolation pilot valve 26 to the monitoring system valve.

Additional pneumatic conduit section 16*n* extends between and is fluidly connected to monitoring system valve 52 and wheel valve 38, with fifth pneumatic conduit section 16*e* extending between the wheel valve and tire valve 40 in the same manner that is described above and shown in FIG. 5. When monitoring system valve 52 is employed, additional pneumatic conduit section 16*n* branches off to separate vehicle axles, with each branch extending through a respective selected axle, and then to each of the tire(s) 14 that are mounted on each axle end. In this manner, monitoring system valve 52 is in fluid communication with all tires 14, and only one monitoring valve is needed for central tire pressure monitoring system 150.

Referring to FIG. 3, monitoring system valve 52 preferably is a spring-biased pilot valve, and includes valve body 64. Valve inlet 56, which is in fluid communication with fourth pneumatic conduit section 16*d*, is formed in valve body 64. Valve outlet 62, which is in fluid communication with additional pneumatic conduit section 16*n*, is also formed in valve body 64. Valve body includes a tee fitting 58, which is formed with cylindrical cavity 60. Lower portion 66 of cavity 60 is disposed between and is in fluid communication with valve inlet 56 and valve outlet 62, interconnecting the valve inlet and the valve outlet.

Poppet assembly 54 is disposed in cavity 60, and is biased to a position that allows air to flow from fourth pneumatic conduit section 16*d* to additional pneumatic conduit section 16*n* when monitoring is not being conducted. More particularly, poppet assembly 54 includes a plunger 74, which is biased by a spring 76 to maintain the plunger in a retracted position and out of lower portion 66 of cavity 60. Air thus flows along a path, indicated by arrows marked F, from fourth pneumatic conduit section 16*d*, through valve inlet 56, through lower portion 66 of cavity 60, past poppet assembly 54, through valve outlet 62, and into additional pneumatic conduit section 16*n*. In this manner, monitoring system valve 52 is biased to allow air to flow from supply tank 12 to tires 14 through conduit 16 when monitoring is not being conducted.

Turning now to FIG. 4, when monitoring is being conducted, test tool 68 is fluidly connected to port 70 formed in tee fitting 58. Port 70 is in fluid communication with tee fitting cavity 60. Test tool 68 includes coupling 86 that may engage threads 72 formed on tee fitting 58, or which may be a quick-connect coupler or other pneumatic connector or coupler known to those skilled in the art. When connected to tee fitting 58, test tool 68 engages poppet valve assembly 54 to redirect air flow through monitoring system valve 52. More particularly, test tool 68 includes piston 78 that contacts plunger 74 of poppet valve assembly 54 and overcomes the bias of spring 76 to urge the piston into lower portion 66 of cavity 60. When piston 78 is urged into channel lower portion 66, O-ring 80 engages sidewalls 82 of the channel lower portion and cooperates with the piston to block the fluid path from valve inlet 56 to valve outlet 62 through the channel lower portion. Air flow, indicated by arrows marked F, then proceeds from additional pneumatic conduit 16*n*, through cavity 60 about plunger 74, through port 70, and into the test tool.

Coupling 86 of test tool 68 includes O-rings 84 to provide a pneumatic seal with port 70. Coupling 86 is formed with a central bore 88, which enables air to pass from channel 60 and port 70 of tee fitting 58, through the coupling, and into indicator 90 of the test tool. Preferably, test tool 68 includes a source of pressurized air (not shown), such as a portable compressor, a portable tank, or a pneumatic line that is connected to a compressor or tank. The pressurized air source enables air to flow through coupling bore 88, port 70, cavity 60, valve outlet 62 and into additional pneumatic conduit section 16*n* to charge the conduit section with air in order to open each wheel valve 38 (FIG. 5). Such opening of each wheel valve 38 enables air to flow from each respective tire 14, through the wheel valve, additional pneumatic conduit section 16n, valve outlet 62, cavity 60, port 70, and into test tool 68 along path F, as indicated in FIG. 4.

Once each wheel valve 38 is open and air flows along path F as indicated in FIG. 4, indicator 90 is able to measure and provide a single readout of the pneumatic pressure for tires 14, since all of the tires on the trailer fluidly connect to additional pneumatic conduit section 16n, as described above. More particularly, the pneumatic pressure measured by test tool 68 decays to the lowest pressure in the system, that is, to the lowest tire pressure level. That pressure level is then indicated by indicator 90, allowing a technician to easily determine if the pressure level is below the target pressure, in which case air needs to be added to tire inflation system 100 (FIG. 5) by means known to those skilled in the art.

Indicator 90 may be any one of various forms or types of pressure indicators. For example, indicator 90 may be a simple mechanical gauge that is provides a reading after the source of pressurized air provides a pressure greater than the target pressure to open wheel valves 38. Once wheel valves 38 are open, air flows along path F as indicated in FIG. 4, and the pressure indicated by indicator 90 decays to the pressure in the lowest one of tires 14.

Another type of indicator 90 may be an electronic unit that employs a step-up procedure to check tire pressure. The step-up procedure is more fully described in U.S. Pat. No. 7,273,082, which is owned by the same owner as the present invention, Hendrickson USA, L.L.C. In summary, the source of pressurized air communicates air bursts through monitoring system valve 52 and to additional pneumatic conduit section 16n. Each burst of air is small enough to prevent elevation of the pressure in tires 14 over the target air pressure, and cumulatively are sufficient to cause wheel valves 38 to open. Once a predetermined number of bursts of air are communicated, indicator 90 measures and indicates the pressure in additional pneumatic conduit section 16n, which equates to the lowest pressure in tires 14, as wheel valves 38 are open. By reading the pressure level on indicator 90, a technician easily determines if the indicated pressure level is below the target pressure, in which case air needs to be added to tire inflation system 100 (FIG. 5) by means known to those skilled in the art. Optionally, if the indicated pressure level is below the target pressure, test tool 68 may be fluidly connected to a source of pressurized air that is sufficient to inflate tires 14 to the target pressure.

In this manner, central tire pressure monitoring system 50, 150 of the present invention provides a system that interfaces with tire inflation system 10, 100 to enable a check of the pressure in all tires 14 of a trailer of a heavy-duty vehicle from a single interface location. More particularly, single monitoring system valve 52 is in fluid communication with all tires 14 on the trailer, thereby providing a simple, easy-to-access interface that extends to all of the tires on the trailer. Monitoring system valve 52 is economical and is easily installed on a tire inflation system 10, 100 as part of a new tire inflation system, or as a retrofit to an existing system.

Monitoring system valve 52 selectively receives test tool 68. Test tool 68 easily and conveniently connects to and disconnects from monitoring system valve 52, enabling a technician to check and monitor the pressure in all tires 14 with one test tool at a single interface location on each trailer. In addition, the easy connection and disconnection of test tool 68 with monitoring system valve 52 enables quick checking and monitoring of tire pressure for many trailers at a site. As a result, central tire pressure monitoring system 50, 150 of the present invention is a self-contained system that is easy and convenient to install and use.

The structure and operation of central tire pressure monitoring system 50, 150 of the present invention eliminate the need to start up or otherwise provide power to the trailer to check the pressure in tires 14 when the trailer is parked. By eliminating the need to power the trailer, fuel or other power required to power up the tire inflation system is saved, and the time involved in powering up the trailer and the tire inflation system is eliminated. As a result, central tire pressure monitoring system 50, 150 of the present invention desirably reduces the cost of maintaining a fleet of trailers.

In addition, central tire pressure monitoring system 50, 150 of the present invention eliminates the need for a technician to walk around each trailer and manually check the pressure in each tire 14 with a tire pressure gauge. As each trailer typically includes eight or more tires, central tire pressure monitoring system 50, 150 of the present invention desirably reduces the time involved in the task of checking tire pressure, in turn reducing the cost of maintaining a fleet of trailers.

By enabling easier and more convenient monitoring of tire pressure, central tire pressure monitoring system 50, 150 of the present invention reduces the likelihood of a trailer being put into operation with under-inflated or over-inflated tires. Such a reduction desirably optimizes the performance and the life of tires 14.

The present invention also includes a method of monitoring the pressure of tires 14 in a tire inflation system 10, 100. By way of example, the method includes providing central tire pressure monitoring system 50, 150, which interfaces with tire inflation system 10, 100, to check the pressure in all tires 14 of a trailer of a heavy-duty vehicle from a single interface location, without the need to provide power to the trailer. The method includes steps in accordance with the description that is presented above and shown in FIGS. 2-6.

It is to be understood that the structure of the above-described central tire pressure monitoring system may be altered or rearranged, or certain components omitted or added, without affecting the overall concept or operation of the invention. In addition, the configuration of components such as monitoring system valve 52, controller 18, and test tool 68 may be changed or adjusted without affecting the concept or operation of the invention. It is to be further understood that the present invention finds application in types of tire inflation systems for heavy-duty vehicles other than those shown and described herein and which are known to those skilled in the art, without affecting the concept or operation of the invention. While reference herein has been made generally to a heavy-duty vehicle for the purpose of convenience, it has been with the understanding that such reference includes trucks, tractor-trailers and semi-trailers, and trailers thereof.

Accordingly, the improved central tire pressure monitoring system is simplified, provides an effective, safe, inexpensive, and efficient structure which achieves all the enumerated objectives, provides for eliminating difficulties encountered with prior art tire pressure monitoring systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the central tire pressure monitoring system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A central tire pressure monitoring system for a heavy-duty vehicle, the heavy-duty vehicle having a tire inflation system with a first source of pressurized air, at least three pneumatically filled tires and a pneumatic conduit fluidly connecting the at least three tires with the first source of pressurized air, the tire inflation system being operable to maintain each of the at least three tires at a selected target pressure, the central tire pressure monitoring system comprising:
    a monitoring valve in fluid communication with the pneumatic conduit of the tire inflation system and including a single port for communicating fluid pressure in the pneumatic conduit of the tire inflation system, the monitoring valve being operable without regard to the operational status of the tire inflation system;
    a second source of pressurized air separate from the tire inflation system selectively fluidly connectable to the port of the monitoring valve, the second source of pressurized air being sufficient to affect fluid communication between the pneumatic conduit and at least one of the at least three tires;
    a manually operated portable test tool separate from the tire inflation system and the heavy-duty vehicle, the portable test tool being selectively fluidly connectable to the port of the monitoring valve between fluidly connected and fluidly disconnected conditions, the portable test tool enabling fluid communication from the port of the monitoring valve to the portable test tool in the fluidly connected condition; and
    an indicator communicating with the portable test tool to provide a reading of a pressure in the pneumatic conduit, the central tire pressure monitoring system determining the pressure status of the at least three tires at the same time from a single location.

2. The central tire pressure monitoring system of claim 1 wherein the fluid pressure in at least one of the at least three tires is indicative of the tire with the lowest pressure tire.

3. The central tire pressure monitoring system of claim 1 wherein the monitoring valve further includes:
    an inlet;
    an outlet in fluid communication with the inlet; and
    a poppet valve assembly for selectively interrupting fluid communication between the inlet and the outlet as a function of the connection condition of the test tool.

4. The central tire pressure monitoring system of claim 3 wherein the test tool actuates the poppet valve assembly when the test tool is in the connected condition to interrupt air flow between the monitoring valve inlet and the monitoring valve outlet.

5. The central tire pressure monitoring system of claim 1 wherein the tire inflation system includes at least one normally open wheel valve located between a respective tire and the monitoring valve to isolate the respective tire in response to a predetermined state.

6. The central tire pressure monitoring system of claim 5 wherein the tire inflation system further comprises a normally closed tire valve fluidly connected to a respective tire, the tire valve being located between the respective tire and the monitoring valve, whereby when the test tool is in the connected condition the source of pressurized air provides sufficient pressurized air through the monitoring valve port to open the tire valve and enable fluid communication between the respective tire and the test tool.

7. A central tire pressure monitoring system for a heavy-duty vehicle, the heavy-duty vehicle having a tire inflation system supplied by electrical power and providing a first source of pressurized air, at least three tires and a pneumatic conduit fluidly connecting the at least three tires with the first source of pressurized air, the tire pressure monitoring system comprising:
    a monitoring valve in fluid communication with the pneumatic conduit of the tire inflation system and including a single port for communicating fluid pressure in the pneumatic conduit;
    a second source of pressurized air separate from the tire inflation system and that is selectively fluidly connectable to the port of the monitoring valve, the source of pressurized air being sufficient to affect fluid communication between the pneumatic conduit and at least one of the at least three tires;
    a portable test tool separate from the tire inflation system, the portable test tool being selectively fluidly connectable to the port of the monitoring valve between fluidly connected and fluidly disconnected conditions, the portable test tool enabling fluid communication from the port of the monitoring valve to the portable test tool in the fluidly connected condition; and
    an indicator operable without electrical power being supplied to the tire inflation system, the indicator for communicating with the portable test tool to provide a reading of a pressure in the pneumatic conduit, the central tire pressure monitoring system determining the pressure status of the at least three tires at the same time from a single location.

8. The central tire pressure monitoring system of claim 7 wherein the fluid pressure in at least one of the at least three tires is indicative of the tire with the lowest pressure tire.

9. The central tire pressure monitoring system of claim 7 wherein the monitoring valve further includes:
    an inlet;
    an outlet in fluid communication with the inlet; and
    a poppet valve assembly for selectively interrupting fluid communication between the inlet and the outlet as a function of the connection condition of the test tool.

10. The central tire pressure monitoring system of claim 9 wherein the test tool actuates the poppet valve assembly when the test tool is in the connected condition to interrupt air flow between the monitoring valve inlet and the monitoring valve outlet.

11. The central tire pressure monitoring system of claim 7 wherein the tire inflation system further comprises a normally closed tire valve fluidly connected to a respective tire, the tire valve being located between the respective tire and the monitoring valve, whereby when the test tool is in the connected condition the source of pressurized air provides sufficient pressurized air through the monitoring valve port to open the tire valve and enable fluid communication between the respective tire and the test tool.

12. The central tire pressure monitoring system of claim 7 wherein the tire inflation system includes at least one normally open wheel valve located between a respective tire and the monitoring valve to isolate the respective tire in response to a predetermined state.

* * * * *

UNITED STATES PATENT AND TRADEMARK OFFICE
CERTIFICATE OF CORRECTION

PATENT NO.         : 10,160,268 B2
APPLICATION NO.    : 14/337374
DATED              : December 25, 2018
INVENTOR(S)        : Phillipi R. Pierce et al.

Page 1 of 1

It is certified that error appears in the above-identified patent and that said Letters Patent is hereby corrected as shown below:

In the Claims

Amend Column 13, Line 58, after the word "pressure" delete the word "tire".

Amend Column 14, Line 51, after the word "pressure" delete the word "tire".

Signed and Sealed this
Nineteenth Day of February, 2019

Andrei Iancu
*Director of the United States Patent and Trademark Office*